United States Patent
Fu et al.

(10) Patent No.: US 11,698,052 B2
(45) Date of Patent: Jul. 11, 2023

(54) PITCH CONTROL OF A WIND TURBINE BASED POSITION DATA FROM POSITION LOCALIZATION SENSORS

(71) Applicant: General Electric Company, Schenectady, NY (US)

(72) Inventors: Xu Fu, Clifton Park, NY (US); Bernard P. Landa, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 472 days.

(21) Appl. No.: 16/783,236

(22) Filed: Feb. 6, 2020

(65) Prior Publication Data
US 2021/0246871 A1 Aug. 12, 2021

(51) Int. Cl.
*F03D 7/02* (2006.01)
*F03D 7/04* (2006.01)
*F03D 17/00* (2016.01)

(52) U.S. Cl.
CPC .......... *F03D 7/0224* (2013.01); *F03D 7/024* (2013.01); *F03D 7/0288* (2013.01); *F03D 7/045* (2013.01); *F03D 7/047* (2013.01); *F03D 7/048* (2013.01); *F03D 17/00* (2016.05); *F05B 2270/17* (2013.01); *F05B 2270/33* (2013.01); *Y02E 10/72* (2013.01)

(58) Field of Classification Search
CPC ...... F03D 7/0224; F03D 7/024; F03D 7/0288; F03D 7/045; F03D 7/047; F03D 7/048; F03D 17/00; F05B 2270/17; F05B 2270/33; Y02E 10/72

USPC .......................................................... 416/31
See application file for complete search history.

(56) References Cited

U.S. PATENT DOCUMENTS

| | | | |
|---|---|---|---|
| 7,970,500 B2 | 6/2011 | Parra Carque | |
| 10,184,456 B2 | 1/2019 | Liu et al. | |
| 2004/0057828 A1 | 3/2004 | Bosche | |
| 2006/0033338 A1* | 2/2006 | Wilson | F03D 7/0224 700/282 |
| 2011/0144815 A1 | 6/2011 | Neumann | |

(Continued)

FOREIGN PATENT DOCUMENTS

| | | |
|---|---|---|
| CA | 3007275 A1 | 6/2017 |
| WO | WO2018050596 A1 | 3/2018 |

(Continued)

OTHER PUBLICATIONS

C94-M8P, u-blox, u-blox RTK Application Board Package https://www.u-blox.com/en/product/c94-m8p.

(Continued)

*Primary Examiner* — Mickey H France
(74) *Attorney, Agent, or Firm* — Dority & Manning, P.A.

(57) ABSTRACT

A method for controlling pitching of at least one rotor blade of a wind turbine includes receiving, via one or more position localization sensors, position data relating to the at least one rotor blade of the wind turbine. Further, the method includes determining, via a controller, a blade deflection signal of the at least one rotor blade based on the position data. Moreover, the method includes determining, via a computer-implemented model stored in the controller, a pitch command for the at least one rotor blade as a function of the blade deflection signal and an azimuth angle of the at least one rotor blade.

11 Claims, 7 Drawing Sheets

(56) References Cited

U.S. PATENT DOCUMENTS

| | | | |
|---|---|---|---|
| 2011/0229300 A1* | 9/2011 | Kanev | F03D 7/043 |
| | | | 415/33 |
| 2013/0287567 A1 | 10/2013 | Olesen et al. | |
| 2014/0255185 A1* | 9/2014 | Plano Morillo | F03D 7/046 |
| | | | 416/43 |
| 2018/0372886 A1* | 12/2018 | Weber | G01S 19/42 |
| 2019/0203698 A1* | 7/2019 | Müller | G01L 1/04 |
| 2020/0005655 A1* | 1/2020 | Schickel | G08G 5/0034 |
| 2020/0056586 A1* | 2/2020 | Ehlers | F03D 7/0224 |
| 2021/0231102 A1* | 7/2021 | Thomsen | F03D 7/0224 |
| 2021/0277869 A1* | 9/2021 | Vasudevan | F03D 7/0296 |
| 2022/0220936 A1* | 7/2022 | Thomsen | F03D 7/0296 |
| 2022/0235738 A1* | 7/2022 | Hauschild | F03D 7/048 |

FOREIGN PATENT DOCUMENTS

| | | |
|---|---|---|
| WO | WO 2018107298 | 6/2018 |
| WO | WO 2019110624 | 6/2019 |

OTHER PUBLICATIONS

NEO-M8P Series, u-blox, u-blox M8 High Precision GNSS Modules, 5 pages. https://www.u-blox.com/en/product/neo-m8p-series.

Web Page Only https://www.researchgate.net/profile/Mohd_Yahva/publication/261841729/figure/fig1/AS:392498989027332@1470590459207/RTK-GPS-Overview_W640.jpg.

Wikipedia, Real-Time Kinematic (Web Page Only) https://en.wikipedia.org/wiki/Real-time_kinematic.

Wohlert, Measuring Rotor Blades with Lasers, Reducing Wear on Wind Turbines, WindTech International, vol. 12, No. 4, Jun. 2016, 4 Pages.

European Search Report for EP Application No. 21155551.1 dated Jul. 2, 2021.

Tordal, Sondre et al., Inverse Kinematic Control of an Industrial Robot used in Vessel-to-Vessel Motion Compensation, 2017 25th Mediterranean Conference on Control and Automation (MED), Valletta, Malta, Jul. 3-6, 2017, pp. 1392-1397.

* cited by examiner

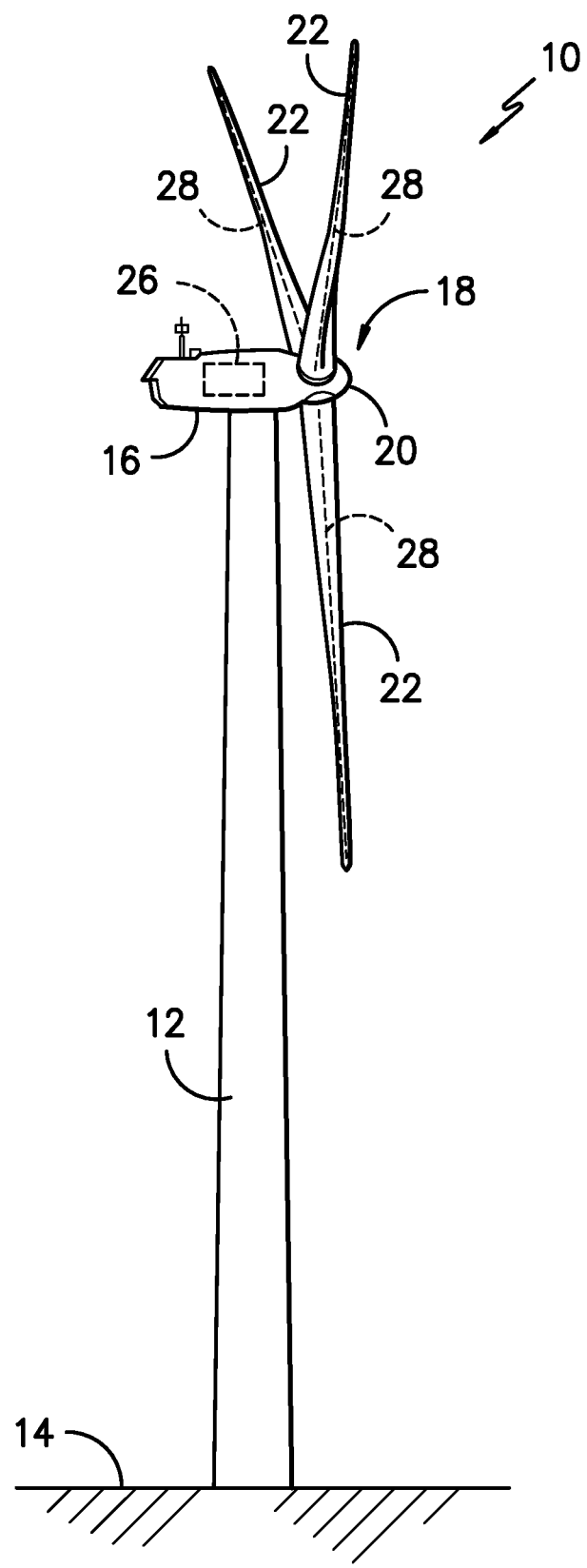
FIG. -1-

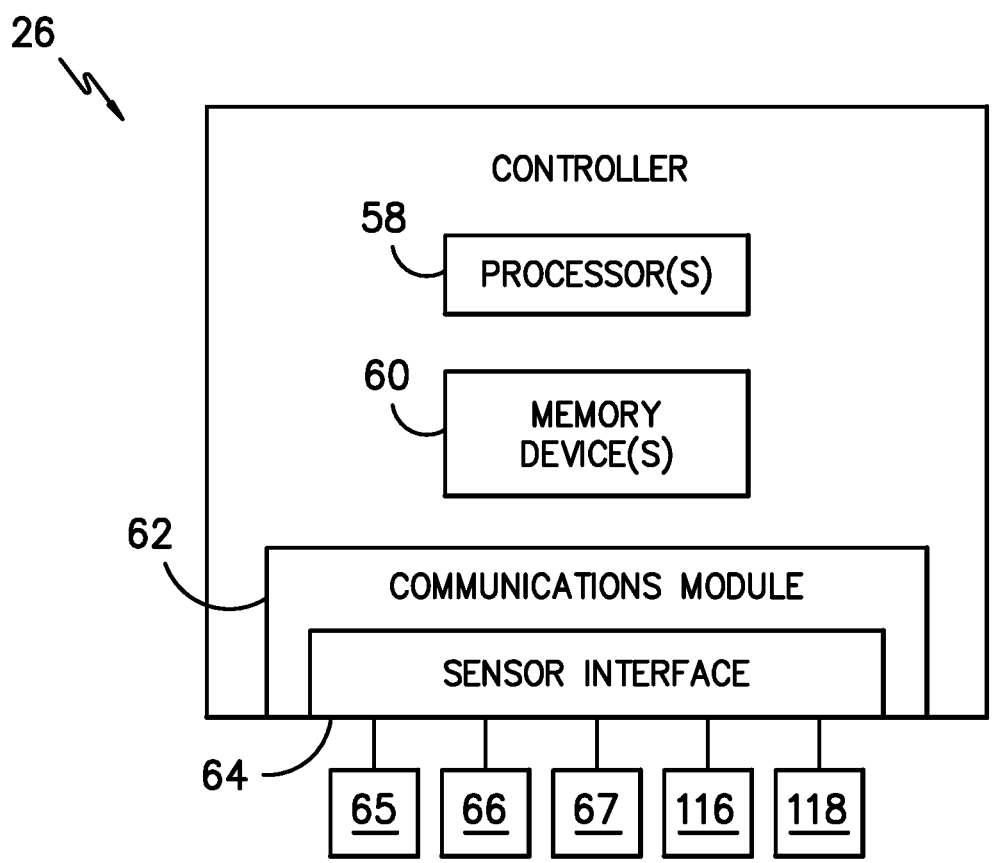
FIG. -2-

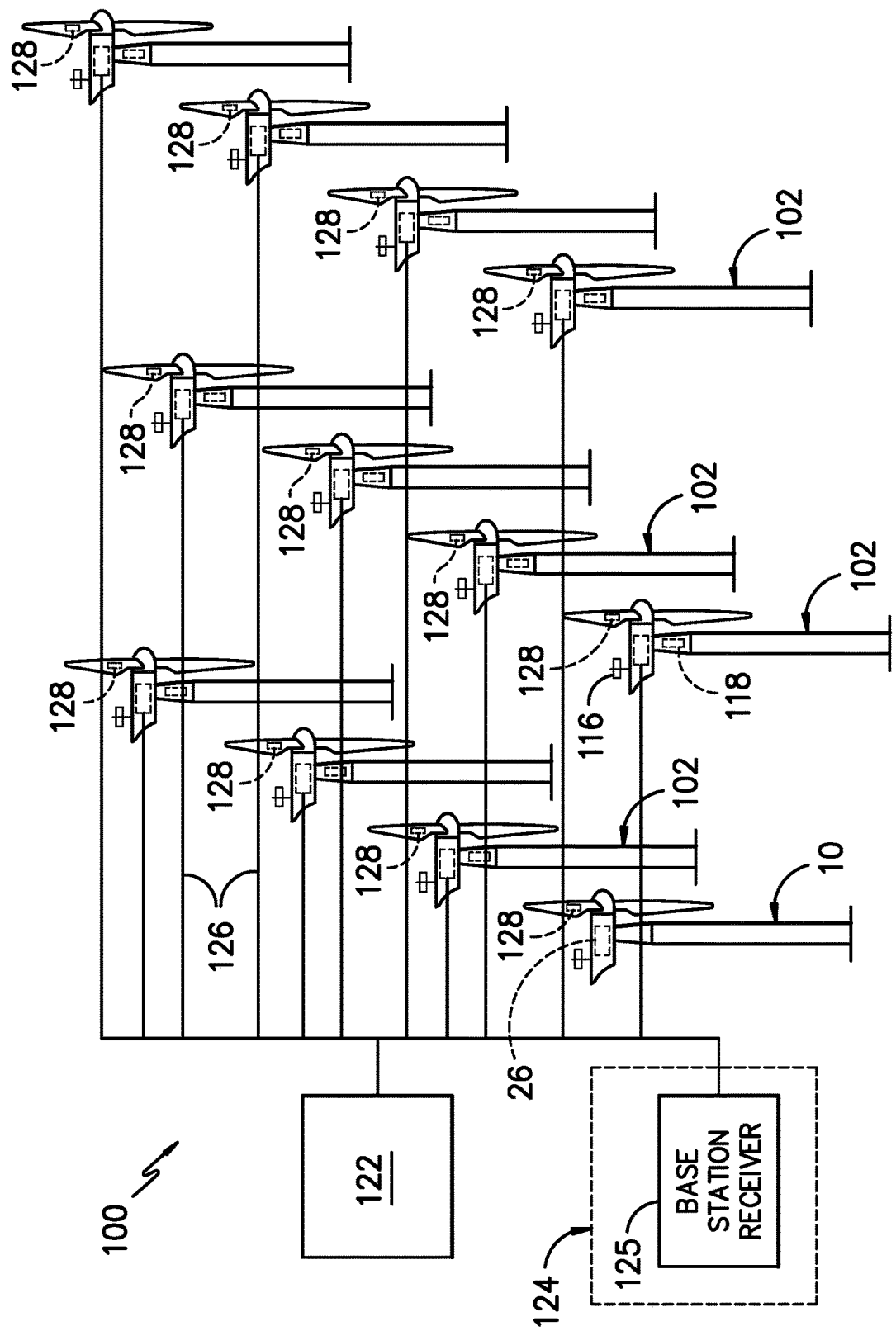
FIG. -3-

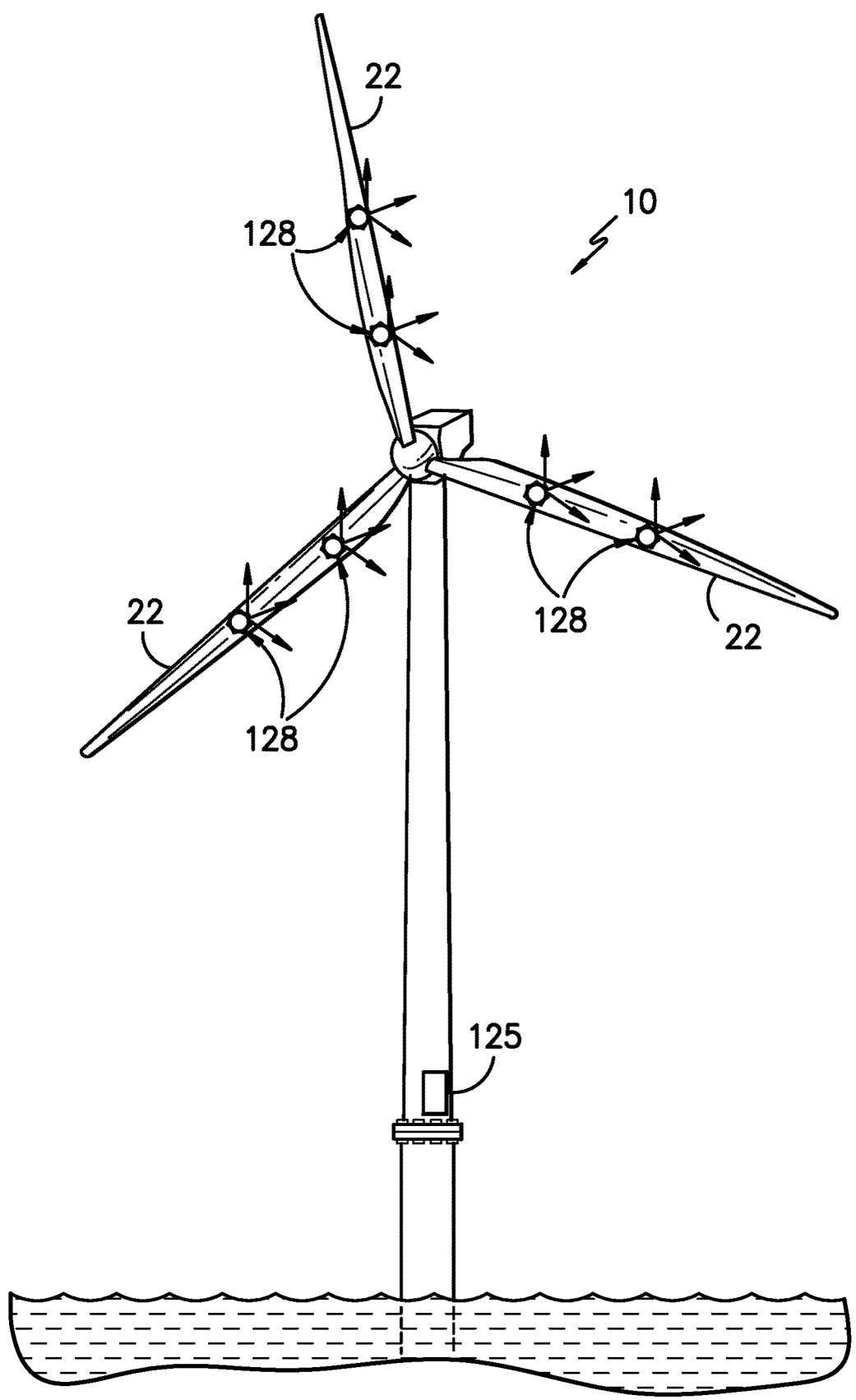
FIG. -4-

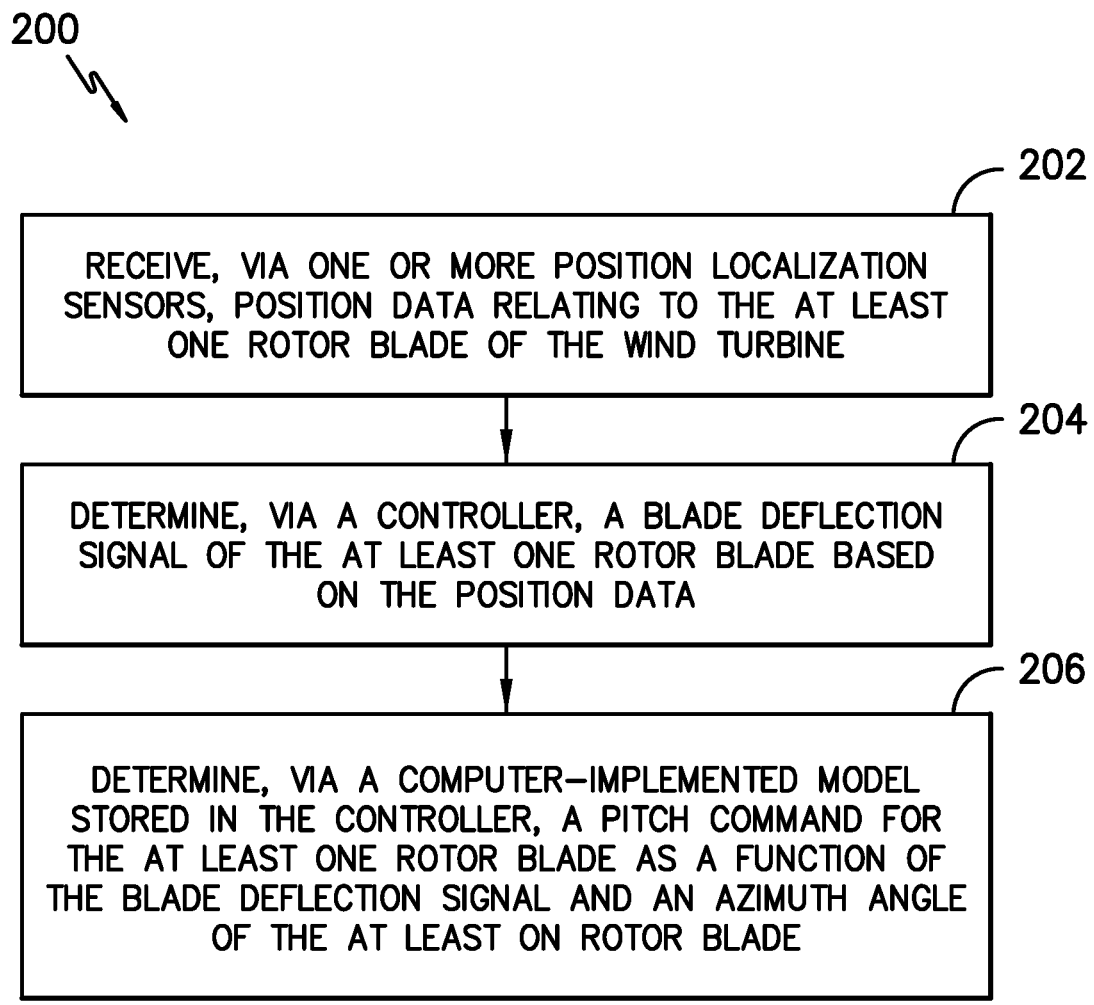
FIG. -5-

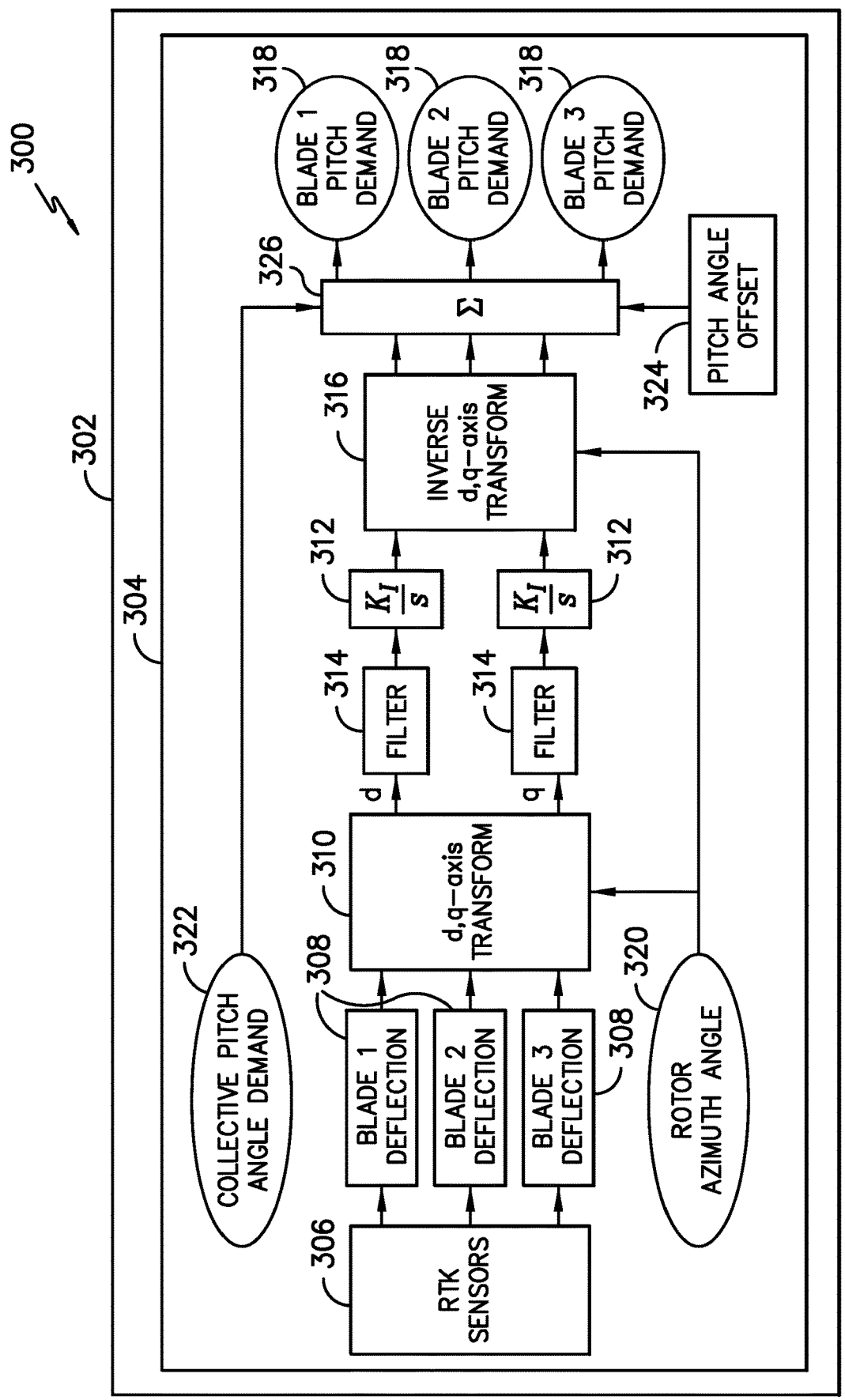
FIG. -6-

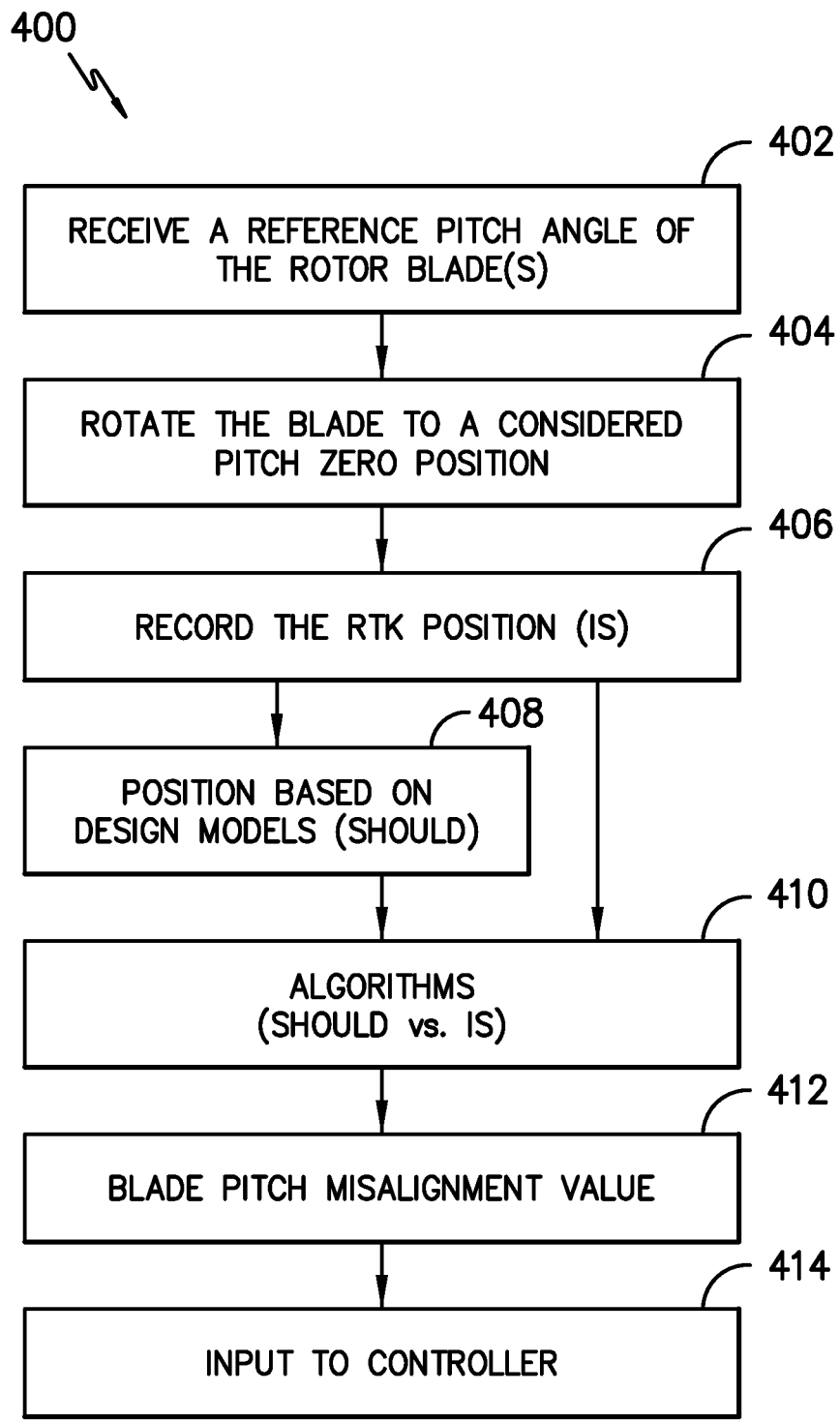
FIG. -7-

PITCH CONTROL OF A WIND TURBINE BASED POSITION DATA FROM POSITION LOCALIZATION SENSORS

FIELD

The present disclosure relates generally to wind turbines, and more specifically, to systems and methods for controlling pitch and/or pitch misalignment of a wind turbine using position data from position localization sensors, such as real-time kinematic (RTK) sensors.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid. Such configurations may also include power converters that are used to convert a frequency of generated electric power to a frequency substantially similar to a utility grid frequency.

In modern wind turbines, various sensor systems are employed to monitor various conditions of the rotor blades. For example, such conditions may include loading and/or pitch alignment, which can have a negative impact on the annual energy production (AEP) of the wind turbine. In general, for onshore wind turbines, a plurality of proximity sensors are installed on the main shaft to measure various moments of the rotor blades. For offshore wind turbines, a plurality of strain sensors are installed on the rotor blades to measure individual blade root bending moments. More particularly, the strain signals from the strain sensors are converted into bending moments. Such sensors, however, tend to experience performance degradation and drift over time and require continued calibration.

As to conventional methods for determining pitch alignment, there are several available methods and/or tools onshore wind turbines. For example, certain wind turbines use image processing technologies combined with the airfoil template of the rotor blades and/or lasers to correct the pitch misalignment. However, these tools/methods cannot be used in offshore wind turbines due to physical constraints (e.g. offshore wind turbines are installed on the sea with no surrounding mounting locations).

In view of the foregoing, the art is continuously seeking new and improved systems and methods for controlling pitch and/or pitch misalignment of a wind turbine. Accordingly, the present disclosure is directed to systems and methods for controlling pitch and/or pitch misalignment of a wind turbine using position data from position localization sensors, such as real-time kinematic (RTK) sensors.

BRIEF DESCRIPTION

Aspects and advantages of the invention will be set forth in part in the following description, or may be obvious from the description, or may be learned through practice of the invention.

In one aspect, the present disclosure is directed to a method for controlling pitching of at least one rotor blade of a wind turbine. The method includes receiving, via one or more position localization sensors, position data relating to the at least one rotor blade of the wind turbine. Further, the method includes determining, via a controller, a blade deflection signal of the at least one rotor blade based on the position data. Moreover, the method includes determining, via a computer-implemented model stored in the controller, a pitch command for the at least one rotor blade as a function of the blade deflection signal and an azimuth angle of the at least one rotor blade.

In an embodiment, the position localization sensor(s) may include one or more of the following: one or more real-time kinematic (RTK) sensors, one or more inertial navigation system (INS) sensors, one or more global positioning system (GPS) sensors, or combinations thereof.

In particular embodiments, the position localization sensor(s) may include the RTK sensor(s). Thus, in such embodiments, the RTK sensor(s) may include a base station and a plurality of mobile stations communicatively coupled to the base station, with the plurality of mobile stations being installed on the rotor blade.

In another embodiment, receiving the position data relating to the rotor blade of the wind turbine may include receiving, via the controller, three-dimensional or two-dimensional position data relating to a position of the base station and receiving, via the controller, three-dimensional or two-dimensional position data relating to a position of each of the plurality of mobile stations.

In further embodiments, determining, via the computer-implemented model stored in the controller, the pitch command for the at least one rotor blade as a function of the blade deflection signal and the azimuth angle may include applying, via the controller, direct-quadrature (d-q) transformation to the blade deflection signal to transform the blade deflection signal into d-q coordinates, filtering the d-q coordinates, and inversing the d-q transformation to transform the d-q coordinates into the pitch command for the at least one rotor blade.

In such embodiments, applying the d-q transformation to the blade deflection signal to transform the blade deflection signal into d-q coordinates may include determining a blade bending moment of the at least one rotor blade using the blade deflection and calculating the d-q coordinates as a function of the blade bending moment and the azimuth angle.

In additional embodiments, the method may include adding a collective pitch angle demand to the pitch command for the rotor blade(s).

In another embodiment, the wind turbine may be part of a wind farm having a plurality of wind turbines and a farm-level controller. In such embodiments, the position localization sensor(s) may communicate with the farm-level controller directly using an existing network of the wind farm or a wireless communication system.

In still further embodiments, the method may include adjusting the pitch command of the rotor blade(s) by a pitch angle offset so as to correct for pitch misalignment of the at least one rotor blade.

In another aspect, the present disclosure is directed to a method for correcting pitch misalignment of at least one rotor blade of a wind turbine, such as an off-shore wind turbine. The method includes receiving, via a controller, a reference pitch angle of the at least one rotor blade. Further, the method includes rotating the rotor blade(s) to a first pitch angle. Moreover, the method includes receiving, via one or more position localization sensors, position data relating to the rotor blade(s) of the wind turbine in the first pitch angle. In addition, the method includes determining, via the controller, a pitch angle offset of the rotor blade(s) based on a difference between the reference pitch angle and the first pitch angle. Thus, the method includes adjusting the first pitch angle of the rotor blade(s) by the pitch angle offset so as to correct the pitch misalignment.

In an embodiment, the reference pitch angle and the first pitch angle may be a reference pitch zero position and a first pitch zero position, respectively. Thus, in another embodiment, the position data may include a zero-twist angle of the rotor blade(s). It should be understood that the method may further include any of the additional features and/or steps as described herein.

In one aspect, the present disclosure is directed to a system for controlling pitching of at least one rotor blade of a wind turbine. The system includes one or more position localization sensors for generating position data relating to the rotor blade(s) of the wind turbine and a controller communicatively coupled to the position localization sensor(s). The controller is configured to perform a plurality of operations, including but not limited to receiving the position data relating to the rotor blade(s) of the wind turbine, determining a blade deflection signal of the rotor blade(s) based on the position data, and determining a pitch command for the rotor blade(s) as a function of the blade deflection signal and an azimuth angle of the rotor blade(s). It should be understood that the wind farm may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a schematic view of one embodiment of a controller for use with the wind turbine shown in FIG. 1;

FIG. 3 illustrates a schematic view of one embodiment of a wind farm according to the present disclosure;

FIG. 4 illustrates a flow diagram of one embodiment of a method for controlling pitching of at least one rotor blade of a wind turbine according to the present disclosure;

FIG. 5 illustrates a front view of one embodiment of a wind turbine according to the present disclosure, particularly illustrating a plurality of position localization sensors mounted to the rotor blades;

FIG. 6 illustrates a block diagram of one embodiment of a system for controlling pitching of at least one rotor blade of a wind turbine according to the present disclosure; and FIG. 7 illustrates a flow diagram of one embodiment of a method for correcting pitch misalignment of at least one rotor blade of a wind turbine according to the present disclosure.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy.

For instance, the hub 20 may be rotatably coupled to an electric generator (not shown) positioned within the nacelle 16 to permit electrical energy to be produced. The generators are sometimes, but not always, rotationally coupled to the rotor 18 through a gearbox. Thus, the gearbox is configured to step up the inherently low rotational speed of the rotor for the generator to efficiently convert the rotational mechanical energy to electric energy. Gearless direct drive wind turbines also exist. The generated electric power is transmitted to an electric grid via at least one electrical connection. Such known wind may be coupled to the electric grid via a known full power conversion assembly. More specifically, full power conversion assemblies may include a rectifier portion that converts alternating current (AC) generated by the generator to direct current (DC) and an inverter that converts the DC to AC of a predetermined frequency and voltage amplitude.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, control various components of the wind turbine 10, and/or implement the various method steps as described herein.

For example, in certain embodiments, the methods described herein may be at least partially processor-implemented. The performance of certain of the operations may be distributed among the one or more processors, not only residing within a single machine, but deployed across a number of machines. The one or more processors may also operate to support performance of the relevant operations in a "cloud computer" environment or as a "software service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

In additional embodiments, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Referring now to FIG. 2, a block diagram of one embodiment of suitable components that may be included within the controller 26 (or farm controller 122) is illustrated in accordance with aspects of the present disclosure. The controller(s) 26, 122 may operate as a standalone device or may be coupled (e.g., networked) to other machines. In a networked deployment, the controller 26 may operate in the capacity of a server machine or a client machine in a server-client network environment, or as a peer machine in a peer-to-peer (or distributed) network environment. By way of non-limiting example, the controller 26 may include or correspond to a server computer, a client computer, a personal computer (PC), a tablet computer, a laptop computer, a netbook, a mobile device, or any machine capable of executing instructions, sequentially or otherwise, that specify actions to be taken by the controller 26.

As shown, the controller 26 may include one or more processor(s) 58 and associated memory device(s) 60 (and/or input/output (I/O) components, not shown) configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 67, 116, 118 to be converted into signals that can be understood and processed by the controller 26. Furthermore, it should be appreciated that the sensors 65, 66, 67, 116, 118 may be communicatively coupled to the communications module 62 using any suitable means. For example, as shown in FIG. 2, the sensors 65, 66, 67, 116, 118 are coupled to the sensor interface 64 via a wired connection. However, in alternative embodiments, the sensors 65, 66, 67, 116, 118 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 67, 116, 118.

The various components of the controller 26, e.g. I/O components, may include a wide variety of components to receive input, provide output, produce output, transmit information, exchange information, capture measurements, and so on. The specific I/O components that are included in a particular machine will depend on the type of machine. For example, portable machines such as mobile phones will likely include a touch input device or other such input mechanisms, while a headless server machine will likely not include such a touch input device. Further, the I/O components may be grouped according to functionality merely for simplifying the following discussion and the grouping is in no way limiting. In further embodiments, the I/O components may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. In additional embodiments, the I/O components may include alphanumeric input components (e.g., a keyboard, a touch screen configured to receive alphanumeric input, a photooptical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

Referring now to FIG. 3, at least some wind turbines are physically positioned in a remote geographical region or in an area where physical access is difficult, such as, off-shore installations. These wind turbines may be physically nested together in a common geographical region to form a wind farm and may be electrically coupled to a common AC collector system. For example, as shown in FIG. 3, one embodiment of a wind farm 100 that may be controlled according to the present disclosure is illustrated. More specifically, as shown, the wind farm 100 may include a plurality of wind turbines 102, including the wind turbine 10 described above, communicatively coupled to a farm controller 122 via a network 126. For example, as shown in the illustrated embodiment, the wind farm 100 includes twelve wind turbines, including wind turbine 10. However, in other embodiments, the wind farm 100 may include any other number of wind turbines, such as less than twelve wind turbines or greater than twelve wind turbines. In one embodiment, the controller 26 of the wind turbine 10 may be communicatively coupled to the farm controller 122 through a wired connection, such as by connecting the controller 26 through suitable communicative links (e.g., a suitable cable). Alternatively, the controller 26 may be communicatively coupled to the farm controller 122 through a wireless connection, such as by using any suitable wireless communications protocol known in the art. In addition, the farm controller 122 may be generally configured similar to the controllers 26 for each of the individual wind turbines 102 within the wind farm 100.

In several embodiments, one or more of the wind turbines 102 in the wind farm 100 may include a plurality of sensors for monitoring various operating data points or control settings of the individual wind turbines 102 and/or one or more wind parameters of the wind farm 100. For example, as shown, each of the wind turbines 102 includes a wind sensor 116, such as an anemometer or any other suitable device, configured for measuring wind speeds or any other wind parameter.

Accordingly, it should be understood that the various sensors 65, 66, 67, 116, 118 described herein may be any suitable sensors configured to measure any operating data points of the wind turbine 10 and/or wind parameters of the wind farm 100 (FIG. 3). For example, in an embodiment, one or more of the sensors may be a position localization sensor, such as a real-time kinematic sensor or sensor system 124, at least partially locally installed onto one or more of the wind turbines 10 and/or integrated with the wind farm controller 122, one or more global positioning system (GPS) sensors, or combinations thereof.

As used herein, position localization sensors, and more particularly real-time kinematic (RTK) sensors, generally refer to sensors that use RTK positioning, which is a satellite navigation technique used to enhance the precision of position data derived from satellite-based positioning systems (global navigation satellite systems, GNSS). Thus, RTK position systems enable a refinement in satellite positioning which is categorized in the frequency range of about 1,164-1,610 Mhz, which is a different frequency ranges from other RF-based devices (such as cellular 3G, Bluetooth, UWB, etc.) that operate at higher frequencies.

Thus, the sensor system 124 of the present disclosure is configured to use measurements of the phase of the signal's carrier wave in addition to the information content of the signal and relies on a single reference station or interpolated virtual station to provide real-time corrections, providing up to centimeter-level accuracy. More specifically, in certain embodiments, as shown in FIGS. 3 and 4, the sensor system 124 may use a single base-station receiver 125 and a plurality of mobile units 128 (e.g. rover station(s)). For example, as shown particularly in FIG. 4, one or more of the mobile units 128 may be locally installed onto each of the rotor blades 22 of the wind turbine 10. As such, the base station 125 re-broadcasts the phase of the carrier that it observes, and the mobile units 128 compare their own phase measurements with the one received from the base station 125. The most popular way to transmit a correction signal from the base station 125 to one or more of the mobile stations 128 to achieve real-time, low-cost signal transmission is to use a radio modem (not shown). However, in certain embodiments, as shown in FIG. 3, rather than using the wireless RF modem, the present disclosure may also implement the communication between the base station 125 and the rover station(s) 128 using the existing network 126 of the wind farm 100. It should also be understood that the position localization sensor(s) may also include inertial navigation system (INS) sensors, global positioning system (GPS) sensors, or combinations of any sensor described herein.

In the present disclosure, for wind turbines, the measurement of positions are used as inputs to incorporate into a wind turbine model and/or algorithm to derive turbine-relevant parameters/variables (such as, model-based estimation) as described herein. Accordingly, the present disclosure encompasses a new system structure that eliminates the radio modems and additional processors of the RTK system, while also providing a more reliable and cost-effective solution. More specifically, in an embodiment, the system of the present disclosure may only need the GPS modules, with the position calculations and the subsequent estimations and controls being implemented in the existing wind turbine controllers.

The sensors 65, 66, 67, 116, 118 described herein may also include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters (e.g. wind speed, wind direction, etc.). Further, the sensors 65, 66, 67, 116, 118 may be located near the ground of the wind turbine 10, on the nacelle 16, on a meteorological mast of the wind turbine 10, or any other location in the wind farm 100.

Accordingly, it should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 67, 116, 118 may, for example, be used to generate signals relating to the parameter being monitored, which can then be utilized by the controller 26 to determine the actual condition.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Referring now to FIG. 5, a flow diagram of one embodiment of a method 200 for controlling pitching of one or more rotor blades, such as the rotor blade(s) 22 of the wind turbine 10, is illustrated. In general, the method 200 is described herein with reference to the wind turbine(s) 10, 102, and the controllers 26, 122 of FIGS. 1-3. However, it should be appreciated that the disclosed method 200 may be implemented with wind turbines having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes receiving, via one or more position localization sensors (such as any of sensors 65, 66, 67, 116, 118), position data relating to the rotor blade(s) of the wind turbine 10. More specifically, in an embodiment, the position data may be three-dimensional or two-dimensional position data relating to a position of the base station 125 and/or three-dimensional or two-dimensional position data relating to a position of each of the plurality of mobile stations 128.

Referring still to FIG. 5, as shown at (204), the method 200 includes determining, via a controller, a blade deflection signal of the rotor blade(s) 22 based on the position data. As shown at (206), the method 200 includes determining, via a computer-implemented model stored in the controller, a pitch command for the rotor blade(s) 22 as a function of the blade deflection signal and an azimuth angle of the rotor blade(s) 22.

The method 200 of FIG. 5 can be better understood with reference to FIG. 6. For example, FIG. 6 illustrates a block diagram of one embodiment of a system 300 for controlling pitching of the rotor blade(s) 22 according to the present disclosure. Thus, as shown, the system 300 includes the controller 302, such as controller 26, and a computer-implemented model 304 stored therein. Accordingly, as shown, position data 306 from the position localization sensors can be used by the computer-implemented model 304 to determine the pitch command(s) 318 for the rotor blade(s) 22 as a function of the blade deflection signal 308 and the azimuth angle. More specifically, as shown, the controller 302 can derive the blade deflection 308 of each of the rotor blades 22 of the wind turbine 10.

Moreover, the controller 302 can then apply direct-quadrature (d-q) transformation 310 to the blade deflection signals 308 to transform the blade deflection signals 308 into d-q coordinates 312. In such embodiments, for example, the controller 302 may determine or derive a blade bending moment of the rotor blades 22 (e.g. $M_{outplane1}$, $M_{outplane2}$, $M_{outplane3}$) using the respective blade deflection signals 308 and calculate the d-q coordinates 312 as a function of the blade bending moment and the azimuth angle 320. Generally, a linear relationship exists between the blade bending moment and the blade deflection, therefore, the blade bending moment can be derived from the blade deflection. Accordingly, in one embodiment, the d-q coordinates 312 may be derived from Equations (1) and (2) below:

$D$=cos(Azimuth Angle)*$M_{outplane1}$+cos(Azimuth Angle+2/3$pi$)*$M_{outplane2}$+cos(Azimuth Angle+4/3$pi$)*$M_{outplane3}$  Equation (1)

$Q$=sin(Azimuth Angle)*$M_{outplane1}$+sin(Azimuth Angle+2/3$pi$)*$M_{outplane2}$+sin(Azimuth Angle+4/3$pi$)*$M_{outplane3}$  Equation (2)

Still referring to FIG. 6, as shown, the controller 302 may also filter the d-q coordinates 312 using one or more filters 314. As shown at 316, the controller 302 can then inverse the d-q transformation to transform the d-q coordinates 312 into the pitch commands 318 for the rotor blade(s) 22. In additional embodiments, as shown at 326, the controller 302 may also be configured to add a collective pitch angle demand 322 to the pitch commands 318 for the rotor blade(s) 22. Moreover, in an embodiment, the controller 302 may be configured to adjust the pitch commands 318 of the rotor blade(s) 22 by a pitch angle offset 324 so as to correct for pitch misalignment of the rotor blade(s) 22, as shown at 326.

Referring now to FIG. 7, a flow diagram of one embodiment of a method 400 for correcting pitch misalignment of at least one rotor blade, such as the rotor blades 22 of the wind turbine 10, is illustrated. In general, the method 400 is described herein with reference to the wind turbine(s) 10, 102, and the controllers 26, 122 of FIGS. 1-3. However, it should be appreciated that the disclosed method 400 may be implemented with wind turbines having any other suitable configurations. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (402), the method 400 includes receiving, via a controller, a reference pitch angle of the rotor blade(s) 22. As shown at (404), the method 400 includes rotating the rotor blade(s) 22 to a first pitch angle. For example, in an embodiment, the reference pitch angle and the first pitch angle may be a reference pitch zero position and a first pitch zero position, respectively. In another embodiment, the position data may include a zero-twist angle of the rotor blade(s) 22. As shown at (406), the method 400 includes receiving and storing/recording, via one or more position localization sensors, position data relating to the rotor blade(s) 22 in the first pitch angle. As shown at (408) through (412), the method 400 includes determining, via the controller, a pitch angle offset of the rotor blade(s) 22 based on a difference between the reference pitch angle and the first pitch angle. For example, as shown at (408), the method 400 includes determining a desired pitch position based on design models. As shown at (410), the method 400 includes comparing the desired pitch position from the design model with the actual pitch position from the sensors. Thus, as shown at (412), the blade pitch misalignment value can be determined by the controller. As shown at (414), the method 400 includes sending the pitch angle offset to the controller and adjusting the first pitch angle of the rotor blade(s) 22 by the pitch angle offset so as to correct the pitch misalignment.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure.

Various aspects and embodiments of the present invention are defined by the following numbered clauses:

Clause 1. A method for controlling pitching of at least one rotor blade of a wind turbine, the method comprising:

receiving, via one or more position localization sensors, position data relating to the at least one rotor blade of the wind turbine;

determining, via a controller, a blade deflection signal of the at least one rotor blade based on the position data; and, determining, via a computer-implemented model stored in the controller, a pitch command for the at least one rotor blade as a function of the blade deflection signal and an azimuth angle of the at least one rotor blade.

Clause 2. The method of clause 1, wherein the one or more position localization sensors comprise one or more of the following: one or more real-time kinematic (RTK) sensors, one or more inertial navigation system (INS) sensors, one or more global positioning system (GPS) sensors, or combinations thereof.

Clause 3. The method of clause 2, wherein the one or more position localization sensors comprise the one or more RTK sensors.

Clause 4. The method of clause 3, wherein the one or more RTK sensors comprise a base station and a plurality of mobile stations communicatively coupled to the base station, the plurality of mobile stations being installed on the rotor blade.

Clause 5. The method of clause 4, wherein receiving the position data relating to the rotor blade of the wind turbine further comprises:

receiving, via the controller, three-dimensional or two-dimensional position data relating to a position of the base station; and, receiving, via the controller, three-dimensional or two-dimensional position data relating to a position of each of the plurality of mobile stations.

Clause 6. The method of any of the preceding claims, wherein determining, via the computer-implemented model stored in the controller, the pitch command for the at least one rotor blade as a function of the blade deflection signal and the azimuth angle further comprises:

applying, via the controller, direct-quadrature (d-q) transformation to the blade deflection signal to transform the blade deflection signal into d-q coordinates;

filtering the d-q coordinates; and, inversing the d-q transformation to transform the filtered d-q coordinates into the pitch command for the at least one rotor blade.

Clause 7. The method of any of the preceding claims, wherein applying the d-q transformation to the blade deflection signal to transform the blade deflection signal into d-q coordinates further comprises:

determining a blade bending moment of the at least one rotor blade using the blade deflection; and, calculating the d-q coordinates as a function of the blade bending moment and the azimuth angle.

Clause 8. The method of any of the preceding claims, further comprising adding a collective pitch angle demand to the pitch command for the at least one rotor blade.

Clause 9. The method of any of the preceding claims, wherein the wind turbine is part of a wind farm comprising a plurality of wind turbines and a farm-level controller, the one or more position localization sensors communicating with the farm-level controller directly using an existing network of the wind farm or a wireless communication system.

Clause 10. The method of any of the preceding claims, further comprising adjusting the pitch command of the at least one rotor blade by a pitch angle offset so as to correct for pitch misalignment of the at least one rotor blade.

Clause 11. A method for correcting pitch misalignment of at least one rotor blade of a wind turbine, the method comprising:

receiving, via a controller, a reference pitch angle of the at least one rotor blade;

rotating the at least one rotor blade to a first pitch angle;

receiving, via one or more position localization sensors, position data relating to the at least one rotor blade of the wind turbine in the first pitch angle;

determining, via the controller, a pitch angle offset of the at least one rotor blade based on a difference between the reference pitch angle and the first pitch angle; and, adjusting the first pitch angle of the at least one rotor blade by the pitch angle offset so as to correct the pitch misalignment.

Clause 12. The method of clause 11, wherein the reference pitch angle and the first pitch angle comprise a reference pitch zero position and a first pitch zero position, respectively.

Clause 13. The method of clauses 11-12, wherein the position data comprises a zero-twist angle of the at least one rotor blade.

Clause 14. The method of clauses 11-13, wherein the one or more position localization sensors comprise one or more of the following: one or more real-time kinematic (RTK) sensors, one or more inertial navigation system (INS) sensors, one or more global positioning system (GPS) sensors, or combinations thereof.

Clause 15. The method of clause 14, wherein the one or more position localization sensors comprise the one or more RTK sensors, the one or more RTK sensors comprising a base station and a plurality of mobile stations communicatively coupled to the base station, the plurality of mobile stations being installed on the rotor blade.

Clause 16. The method of clauses 11-15, wherein the wind turbine comprises an off-shore wind turbine.

Clause 17. A system for controlling pitching of at least one rotor blade of a wind turbine, the system comprising:

one or more position localization sensors for generating position data relating to the at least one rotor blade of the wind turbine;

a controller communicatively coupled to the one or more position localization sensors, the controller configured to perform a plurality of operations, the plurality of operations comprising:

receiving the position data relating to the at least one rotor blade of the wind turbine;

determining a blade deflection signal of the at least one rotor blade based on the position data; and, determining a pitch command for the at least one rotor blade as a function of the blade deflection signal and an azimuth angle of the at least one rotor blade.

Clause 18. The system of clause 17, wherein the one or more position localization sensors comprise one or more of the following: one or more real-time kinematic (RTK) sensors, one or more inertial navigation system (INS) sensors, one or more global positioning system (GPS) sensors, or combinations thereof.

Clause 19. The system of clauses 17-18, wherein the one or more position localization sensors comprise the one or more RTK sensors, the one or more RTK sensors comprising a base station and a plurality of mobile stations communicatively coupled to the base station, the plurality of mobile stations being installed on the rotor blade.

Clause 20. The system of clause 19, wherein receiving the position data relating to the rotor blade of the wind turbine further comprises:

receiving three-dimensional or two-dimensional position data relating to a position of the base station; and, receiving three-dimensional or two-dimensional position data relating to a position of each of the plurality of mobile stations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling pitching of at least one rotor blade of a wind turbine, the method comprising:

receiving, via one or more real-time kinematic (RTK) sensors installed on the at least one rotor blade, position data relating to the at least one rotor blade of the wind turbine;

determining, via a controller, a blade deflection signal of the at least one rotor blade based on the position data from the one or more RTK sensors; and determining, via a computer-implemented model stored in the controller, a pitch command for the at least one rotor blade as a function of the blade deflection signal and an azimuth angle of the at least one rotor blade.

2. The method of claim 1, wherein the one or more RTK sensors comprise a base station and a plurality of mobile stations communicatively coupled to the base station, the plurality of mobile stations being installed on the rotor blade.

3. The method of claim 2, wherein receiving the position data relating to the rotor blade of the wind turbine further comprises:

receiving, via the controller, three-dimensional or two-dimensional position data relating to a position of the base station; and, receiving, via the controller, three-dimensional or two-dimensional position data relating to a position of each of the plurality of mobile stations.

4. The method of claim 1, wherein determining, via the computer-implemented model stored in the controller, the pitch command for the at least one rotor blade as a function of the blade deflection signal and the azimuth angle further comprises:

applying, via the controller, direct-quadrature (d-q) transformation to the blade deflection signal to transform the blade deflection signal into d-q coordinates;

filtering the d-q coordinates; and, inversing the d-q transformation to transform the filtered d-q coordinates into the pitch command for the at least one rotor blade.

5. The method of claim 4, wherein applying the d-q transformation to the blade deflection signal to transform the blade deflection signal into d-q coordinates further comprises:

determining a blade bending moment of the at least one rotor blade using the blade deflection; and, calculating the d-q coordinates as a function of the blade bending moment and the azimuth angle.

6. The method of claim 1, further comprising adding a collective pitch angle demand to the pitch command for the at least one rotor blade.

7. The method of claim 1, wherein the wind turbine is part of a wind farm comprising a plurality of wind turbines and a farm-level controller, the one or more position localization sensors communicating with the farm-level controller directly using an existing network of the wind farm or a wireless communication system.

8. The method of claim 1, further comprising adjusting the pitch command of the at least one rotor blade by a pitch angle offset so as to correct for pitch misalignment of the at least one rotor blade.

9. A system for controlling pitching of at least one rotor blade of a wind turbine, the system comprising:

one or more real-time kinematic (RTK) sensors installed on the at least one rotor blade for generating position data relating to the at least one rotor blade of the wind turbine;

a controller communicatively coupled to the one or more position localization sensors, the controller configured to perform a plurality of operations, the plurality of operations comprising:

receiving the position data from the one or more RTK sensors relating to the at least one rotor blade of the wind turbine;

determining a blade deflection signal of the at least one rotor blade based on the position data; and determining a pitch command for the at least one rotor blade as a function of the blade deflection signal and an azimuth angle of the at least one rotor blade.

10. The system of claim 9, wherein the one or more RTK sensors comprise a base station and a plurality of mobile stations communicatively coupled to the base station, the plurality of mobile stations being installed on the rotor blade.

11. The system of claim 10, wherein receiving the position data from the one or more RTK sensors relating to the rotor blade of the wind turbine further comprises:

receiving three-dimensional or two-dimensional position data relating to a position of the base station; and receiving three-dimensional or two-dimensional position data relating to a position of each of the plurality of mobile stations.

\* \* \* \* \*